US010046717B2

(12) United States Patent
Fisher

(10) Patent No.: US 10,046,717 B2
(45) Date of Patent: Aug. 14, 2018

(54) EMERGENCY VEHICLE LIGHTING AND VIDEO SYSTEM

(71) Applicant: Halcore Group, Inc., Grove City, OH (US)

(72) Inventor: Eric Fisher, Columbus, OH (US)

(73) Assignee: Halcore Group, Inc., Grove City, OH (US)

( * ) Notice: Subject to any disclaimer, the term of this patent is extended or adjusted under 35 U.S.C. 154(b) by 221 days.

(21) Appl. No.: 15/070,829

(22) Filed: Mar. 15, 2016

(65) Prior Publication Data

US 2016/0272126 A1 Sep. 22, 2016

Related U.S. Application Data

(60) Provisional application No. 62/134,421, filed on Mar. 17, 2015.

(51) Int. Cl.
*B60R 11/04* (2006.01)
*H04N 5/225* (2006.01)
*B60R 11/00* (2006.01)

(52) U.S. Cl.
CPC .......... *B60R 11/04* (2013.01); *B60R 2011/004* (2013.01); *H04N 5/2256* (2013.01)

(58) Field of Classification Search
CPC .. B60R 11/04; B60R 2011/004; H04N 5/2256
USPC ........................................................ 348/148
See application file for complete search history.

(56) References Cited

U.S. PATENT DOCUMENTS

| 3,637,284 | A | * | 1/1972 | Plyler | F21S 48/155 385/81 |
| 6,124,886 | A | * | 9/2000 | DeLine | B60Q 1/2665 340/433 |
| 7,619,680 | B1 | * | 11/2009 | Bingle | B60R 11/04 348/342 |
| 8,833,993 | B1 | * | 9/2014 | Lyons | B60Q 1/263 340/472 |
| 9,304,386 | B1 | * | 4/2016 | Clement | G03B 17/08 |
| 9,637,053 | B2 | * | 5/2017 | Schofield | B60R 1/025 |
| 2005/0046696 | A1 | * | 3/2005 | Lang | B60Q 1/0023 348/148 |
| 2017/0182955 | A1 | * | 6/2017 | Takeda | B60R 11/04 |

* cited by examiner

*Primary Examiner* — William C. Vaughn, Jr.
*Assistant Examiner* — Jae N Noh
(74) *Attorney, Agent, or Firm* — Hovey Williams LLP

(57) ABSTRACT

A modular video assembly is mounted on an exterior surface of a vehicle and includes an elongated housing and a camera. The housing presents spaced apart housing ends and a chamber between the housing ends. The camera is removably mounted at least partly within the chamber. The housing presents an inboard mounting surface that extends longitudinally between the housing ends, with the mounting surface operable to be opposed to the exterior surface when the assembly is mounted to the vehicle. The housing presents an outboard exposed surface that extends longitudinally to at least partly cover the chamber and is located outboard of the mounting surface. At least part of the exposed surface projects outboard of the camera to protect the camera when the assembly is mounted to the vehicle.

16 Claims, 9 Drawing Sheets

EMERGENCY VEHICLE LIGHTING AND VIDEO SYSTEM

RELATED APPLICATION

This application claims the benefit of U.S. Provisional Application Ser. No. 62/134,421, filed Mar. 17, 2015, entitled EMERGENCY VEHICLE LIGHTING AND VIDEO SYSTEM, which is hereby incorporated in its entirety by reference herein.

BACKGROUND

1. Field

The present invention relates generally to vehicles with video systems. More specifically, embodiments of the present invention concern an emergency vehicle with a modular video system mounted on an exterior surface of the vehicle.

2. Discussion of Prior Art

Video equipment has been incorporated into prior art vehicles for various purposes. For instance, conventional passenger cars have a rear-facing camera to assist the driver with driving the car in reverse gear. Known emergency vehicles used by police officers include a forward-facing camera mounted in the passenger compartment.

However, prior art vehicles with video cameras have various deficiencies. For instance, video cameras on conventional vehicles provide a limited range of visibility to the operator. Relatively large vehicles, such as an ambulance, are notoriously difficult to outfit with video surveillance equipment. Furthermore, conventional video cameras used on relatively large vehicles provide video with limited range and limited video quality.

SUMMARY

The following brief summary is provided to indicate the nature of the subject matter disclosed herein. While certain aspects of the present invention are described below, the summary is not intended to limit the scope of the present invention.

Embodiments of the present invention provide a video assembly that does not suffer from the problems and limitations of the prior art video systems set forth above.

A first aspect of the present invention concerns a modular video assembly configured to be mounted on an exterior surface of a vehicle. The modular video assembly broadly includes an elongated housing and a camera. The housing presents spaced apart housing ends and a chamber between the housing ends. The camera is removably mounted at least partly within the chamber. The housing presents an inboard mounting surface that extends longitudinally between the housing ends, with the mounting surface operable to be opposed to the exterior surface when the assembly is mounted to the vehicle. The housing presents an outboard exposed surface that extends longitudinally to at least partly cover the chamber and located outboard of the mounting surface. At least part of the exposed surface projects outboard of the camera to protect the camera when the assembly is mounted to the vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 1:
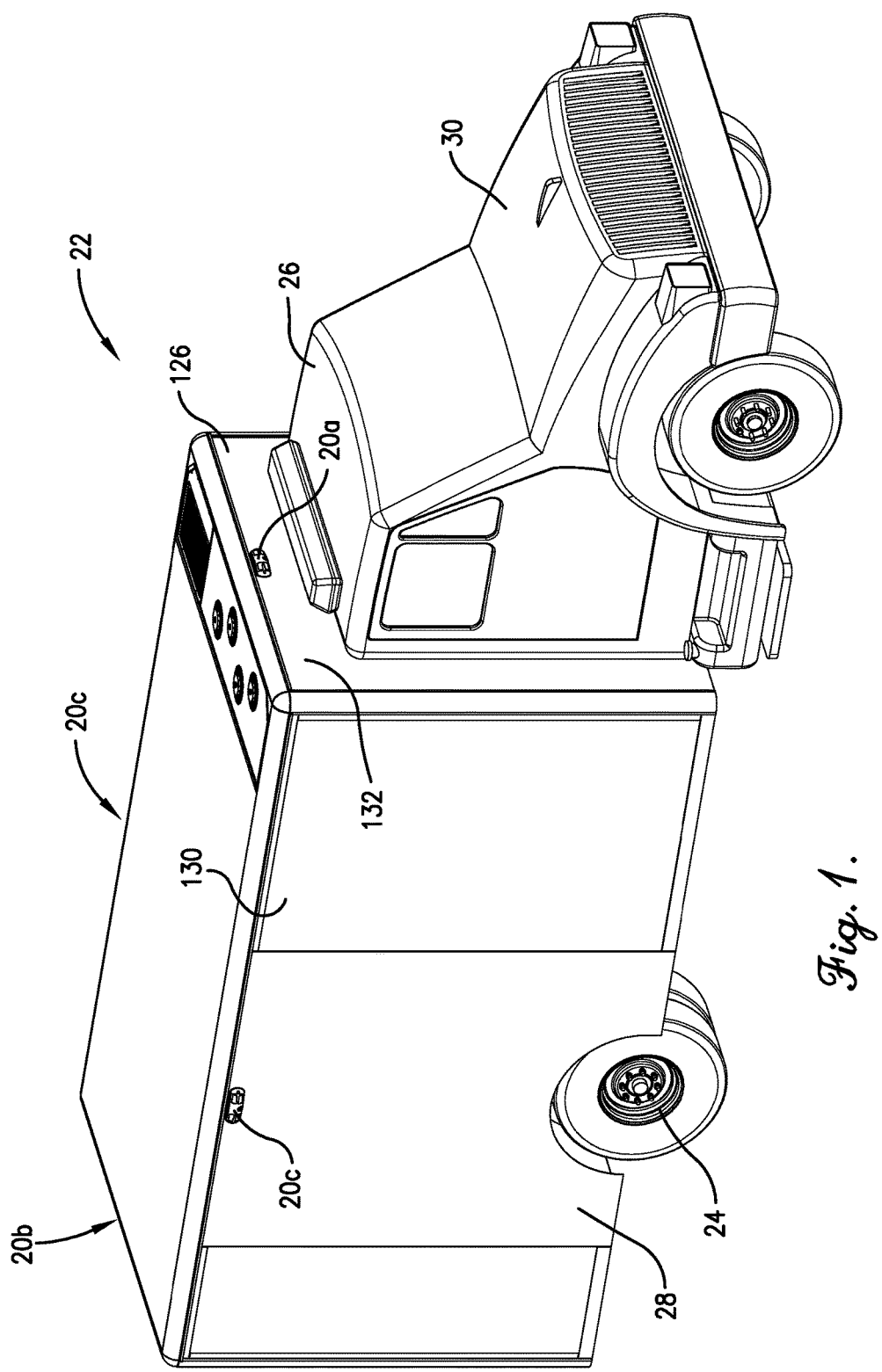
FIG. 1 is a front perspective of an emergency response vehicle constructed in accordance with a preferred embodiment of the present invention, showing multiple video assemblies mounted on the vehicle.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1-4, a preferred modular video assembly 20 is configured to be used as part of a service vehicle 22. The illustrated service vehicle 22 is preferably used as an emergency response vehicle, such as an ambulance. However, the principles of the present invention are applicable where the service vehicle 22, or various features thereof, are employed for other applications.

The vehicle 22 preferably includes a wheeled chassis 24, a cab 26, a service compartment 28, and multiple video assemblies 20. The wheeled chassis 24 and cab 26 are conventional and are provided as part of a conventional, self-propelled truck 30. In the usual manner, the truck 30 is customized by mounting the service compartment 28 to the frame (not shown) of the wheeled chassis 24 at a location aft of the cab 26.

The video assemblies 20 are preferably installed to provide a front video assembly 20a, a rear video assembly 20b, and opposite side video assemblies 20c. Each video assembly 20 preferably includes a protective housing 32, camera 34, and lights 36. As will be discussed in greater detail, each video assembly 20 has a generally modular construction and is mounted to the vehicle 22 at one of several locations.

The housing 32 is operable to support the camera 34 and lights 36 on the vehicle 22. At the same time, the housing 32 is also configured to protect the camera 34 and lights 36 and to restrict external objects and weather from accessing the camera 34 and lights 36. For instance, the housing 32 is preferably configured to restrict external objects, such as a tree or street sign, from contacting and damaging the camera 34 and lights 36. The housing 32 preferably comprises a unitary structure and includes a generally bulbous shell 38, mounting bosses 40, camera bosses 42, gussets 44,46, and opposed pairs of connectors 48,50 (see FIGS. 4-6).

Turning to FIGS. 4-7, the camera 34 is configured to record images of the exterior area adjacent to the video assembly 20. The camera 34 preferably includes a camera sensor 52 and a sensor mounting bracket 54. The camera sensor 52 preferably comprises a digital sensor and includes a lens 56 and a sensor wire 58.

The bracket 54 comprises a unitary metal strip that includes a base plate 60 and a tongue 62. The base plate 60 presents a central wire opening 63 (see FIG. 4). The camera sensor 52 is preferably fixed to the tongue 62 so that the camera 34 has a unitary structure.

Figure 3:
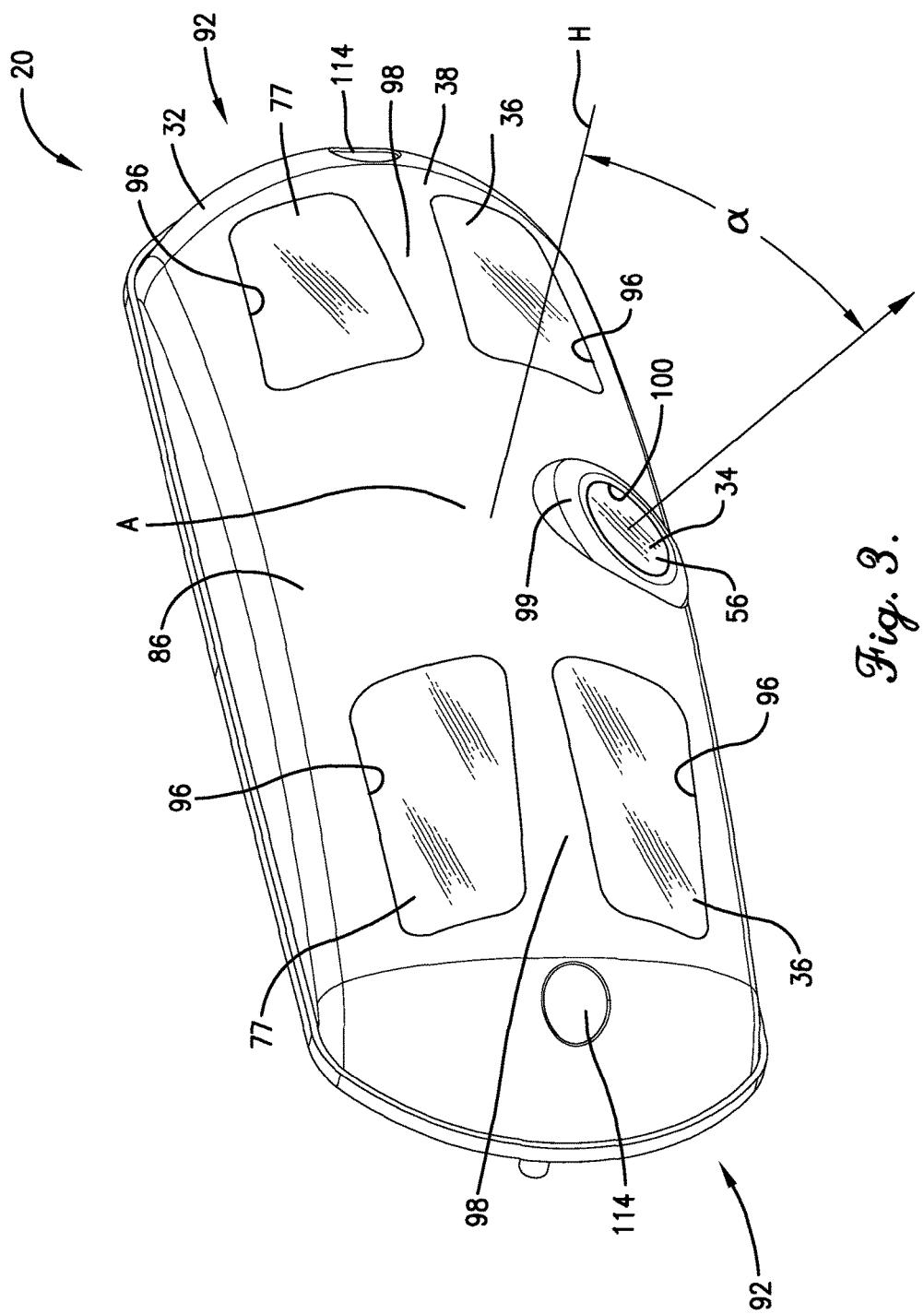
FIG. 3 is a front perspective of a video assembly shown in FIGS. 1 and 2, showing a housing, camera, and lights of the video assembly.

When the video assembly 20 is installed with the camera 34 in the housing 32, the lens 56 of the camera 34 preferably faces downwardly at a view angle α measured from a horizontal line H (see FIG. 3). The view angle α preferably ranges from about zero degrees (0°) to about forty-five degrees (45°).

The illustrated camera 34 could be alternatively configured without departing from the scope of the present invention. Also, while the video assembly 20 preferably has a single camera 34, the video assembly 20 could include more than one camera 34.

Turning to FIGS. 6-9, the lights 36 are preferably configured to illuminate the exterior area adjacent to the video assembly 20. Each light 36 preferably includes a circuit board 64, light emitting diodes (LEDs) 66, a transparent lens cover 68, potting material 70, and a power wire 72.

The lens cover 68 is unitary and includes a pair of transparent outboard protrusions 74 and an endless inboard rim 76. The protrusions 74 cooperatively present an illuminated exposed surface 77 of the lens cover 68. The lens cover 68 also presents a stop surface 78 (see FIG. 8) located between the protrusions 76 and an open face 80 (see FIG. 9) surrounded by the inboard rim 76. Yet further, the lens cover 68 presents a cavity 82 (see FIG. 9) that communicates with the open face 80 and a pair of interior shoulders 84 (see FIG. 9).

In the usual manner, the LEDs 66 are mounted to the circuit board 64. The power wire 72 is also mounted to the circuit board 64 so that the power wire 72 is electrically connected to each LED 66. Thus, the LEDs 66 are powered by applying electrical power to the power wire 72.

The light 36 is constructed by inserting the circuit board 64 through the open face 80 of the lens cover 68 and by locating the circuit board 64 in contact with the shoulders 84. The circuit board 64 is located so that the LEDs 66 are positioned between the circuit board 64 and lens cover 68 to face outwardly.

With the circuit board 64 inserted within the lens cover 68, a liquid potting resin is poured into the cavity 82 between the circuit board 64 and the open face 80. Once the potting resin cures, the LEDs 66 are preferably hermetically sealed within the lens cover 68.

Turning to FIGS. 3-7, the shell 38 comprises a generally rigid and continuous layer of material that presents an outboard exposed surface 86, an interior surface 88, and a generally planar inboard mounting surface 90. The shell 38 is also elongated to present spaced apart housing ends 92 and a chamber 94 between the housing ends 92. The chamber 94 is partly formed by the interior surface 88.

The outboard exposed surface 86 extends longitudinally between the housing ends 92 to at least partly cover the chamber 94. The exposed surface 86 is generally located outboard of the mounting surface 90. The inboard mounting surface 90 extends longitudinally between the housing ends 92 and is operable to be opposed to an exterior surface of the vehicle 22 when the video assembly 20 is mounted to the vehicle 22.

Figure 5:
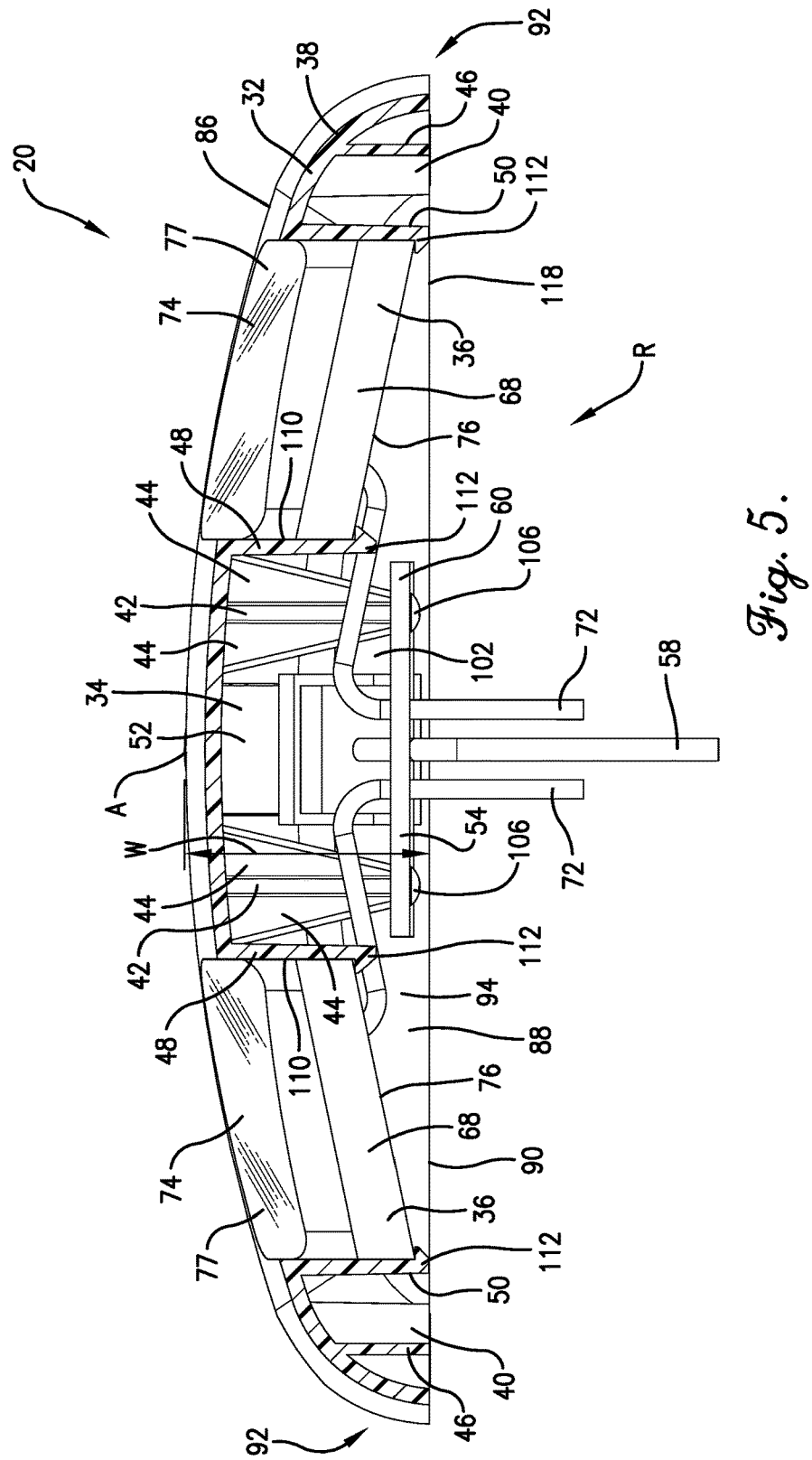
FIG. 5 is a cross section of the video assembly taken along line 5-5 in FIG. 4.

The exposed surface 86 and the mounting surface 90 cooperative define a lateral width dimension W (see FIG. 5). Because the exposed surface 86 has a generally convex shape, the exposed surface 86 defines an outboard apex A of the housing 32 where the lateral width dimension W is at a maximum value (see FIGS. 3 and 5). The outboard apex A is spaced between the housing ends 92. The lateral width dimension W preferably tapers from adjacent the outboard apex A toward at least one of the housing ends 92.

The shell 38 also preferably presents pairs of light openings 96 (see FIGS. 3 and 7) that extend through the shell 38 and intersect the exposed and interior surfaces 86,88. Thus, the light openings 96 communicate with the chamber 94 and permit light to be transmitted from the lights 36 to an exterior area adjacent the vehicle 22. The shell 38 includes dividing sections 98 that separate a corresponding pair of light openings 96 (see FIGS. 3 and 7).

Figure 7:
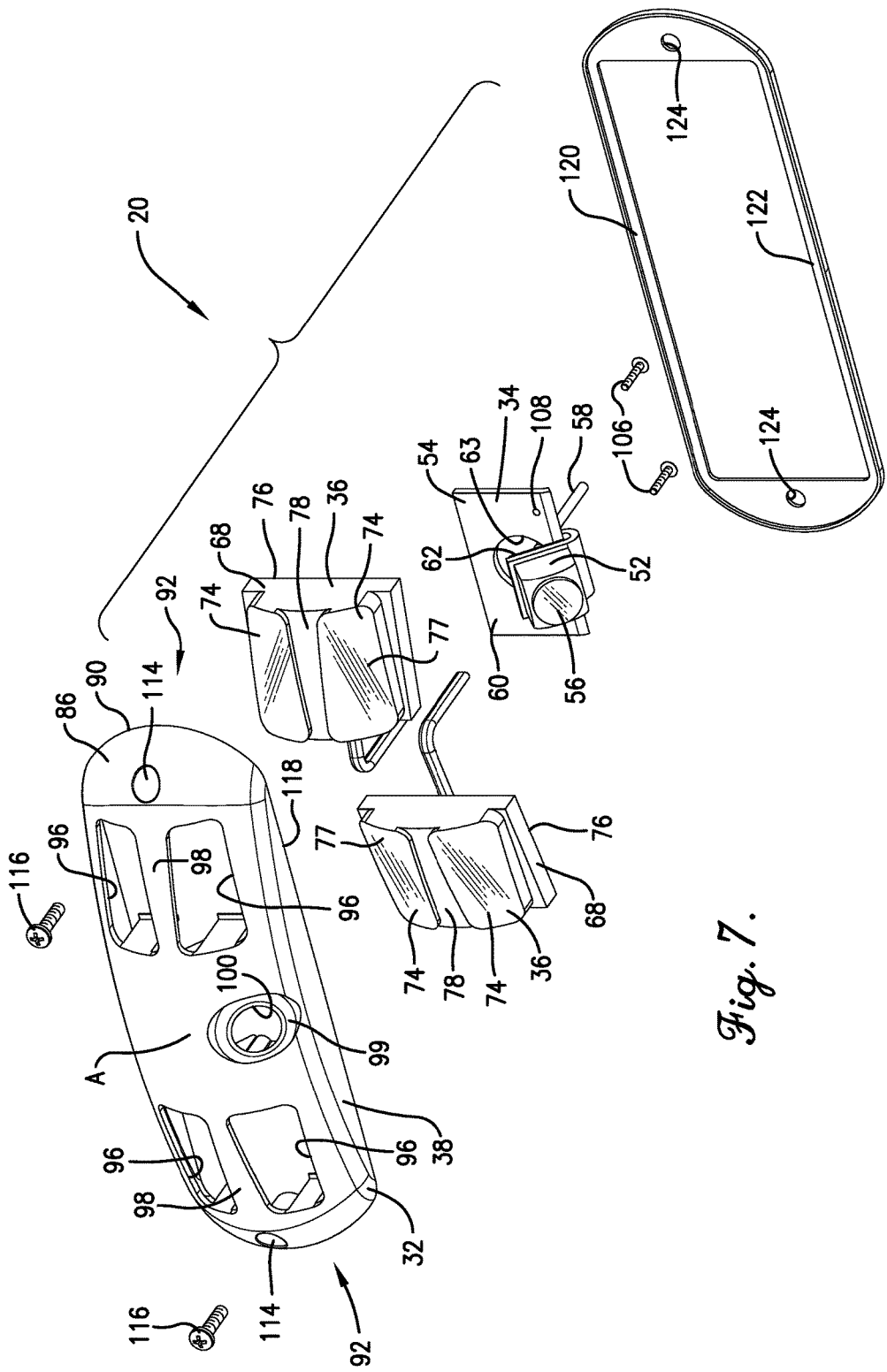
FIG. 7 is an exploded front perspective of the video assembly shown in FIGS. 1-6.
Figure 8:
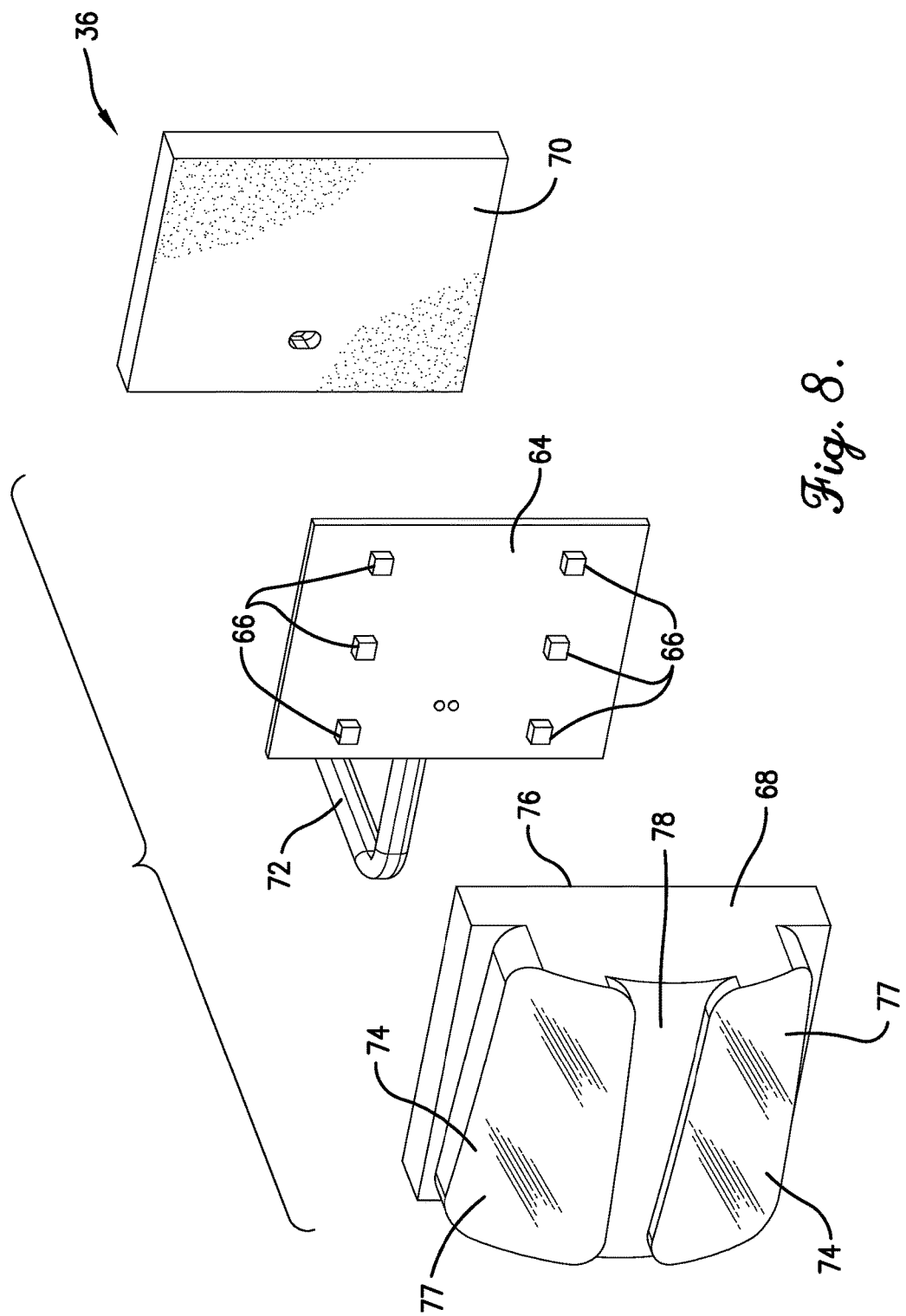
FIG. 8 is an exploded front perspective of one of the lights shown in FIGS. 1-7.
Figure 9:
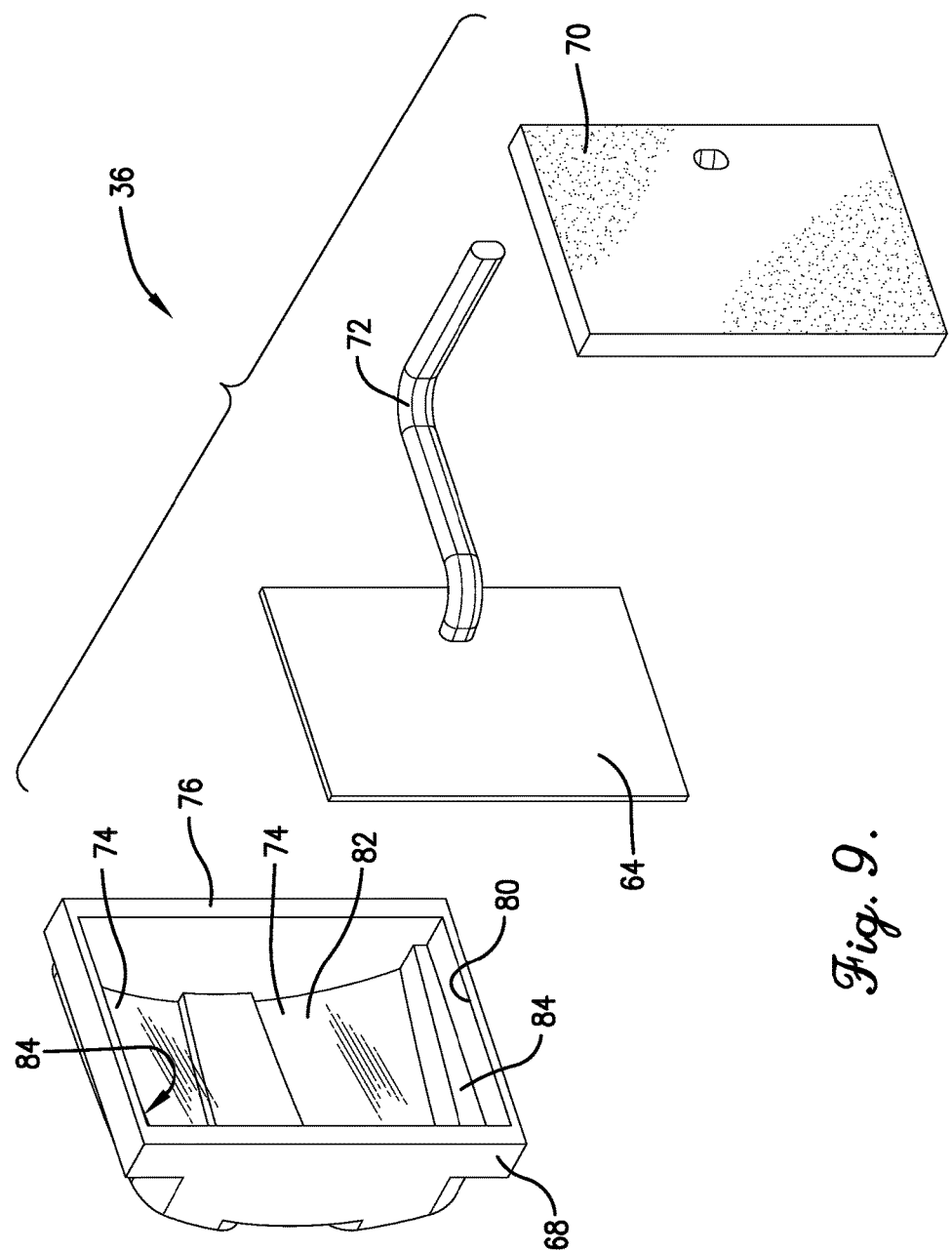
FIG. 9 is an exploded front perspective of the light shown in FIGS. 1-8.

The housing also includes a central bulbous portion 99 that is integrally formed with the shell 38 (see FIGS. 3 and 7). The central bulbous portion 99 presents a central camera opening 100 that extends through the shell 38 and intersects the exposed and interior surfaces 86,88. Thus, the camera opening 100 communicates with the chamber 94 and permits light to be transmitted between the camera 34 and an exterior area adjacent the vehicle 22.

Figure 4:
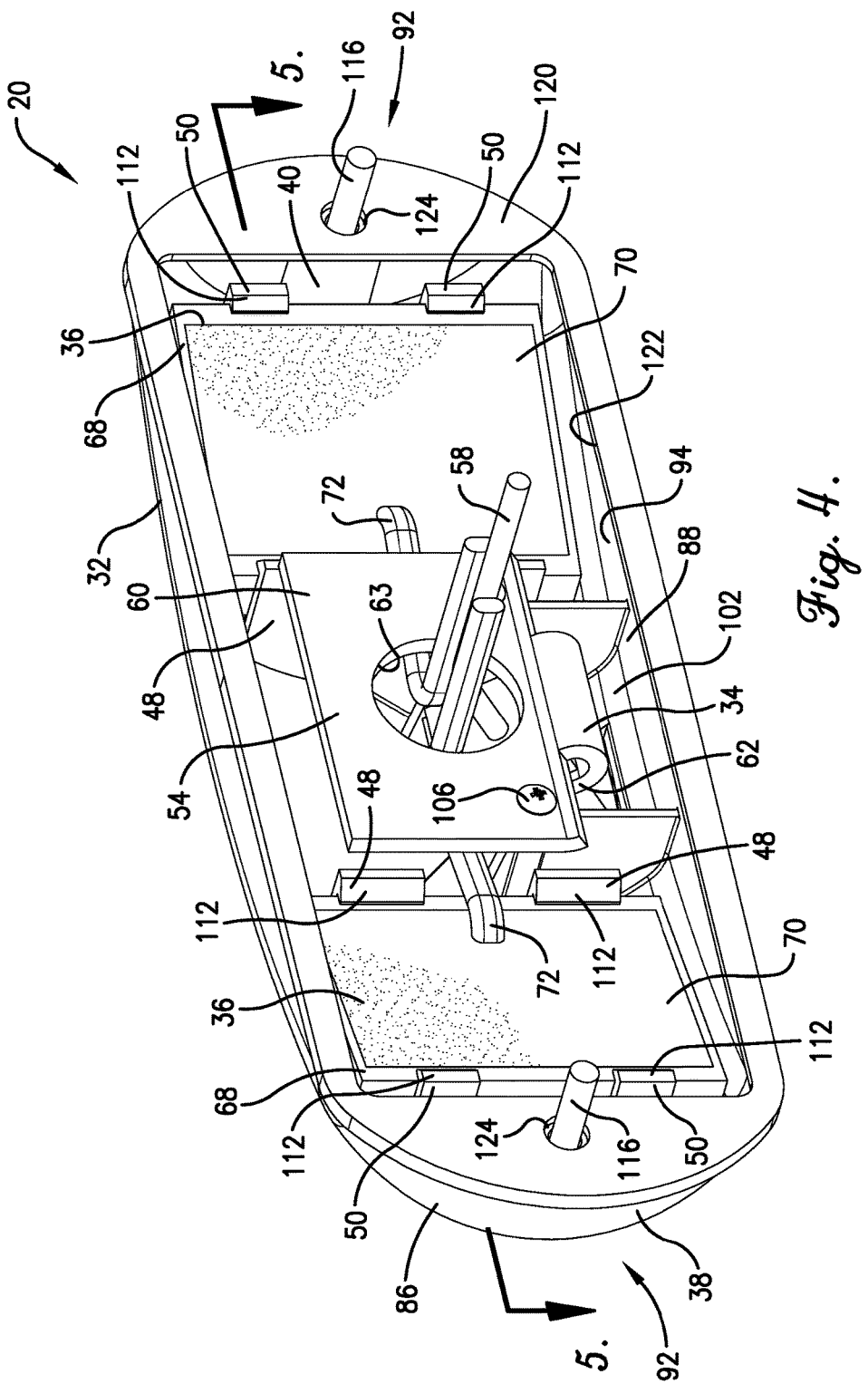
FIG. 4 is a rear perspective of the video assembly shown in FIGS. 1-3.
Figure 6:
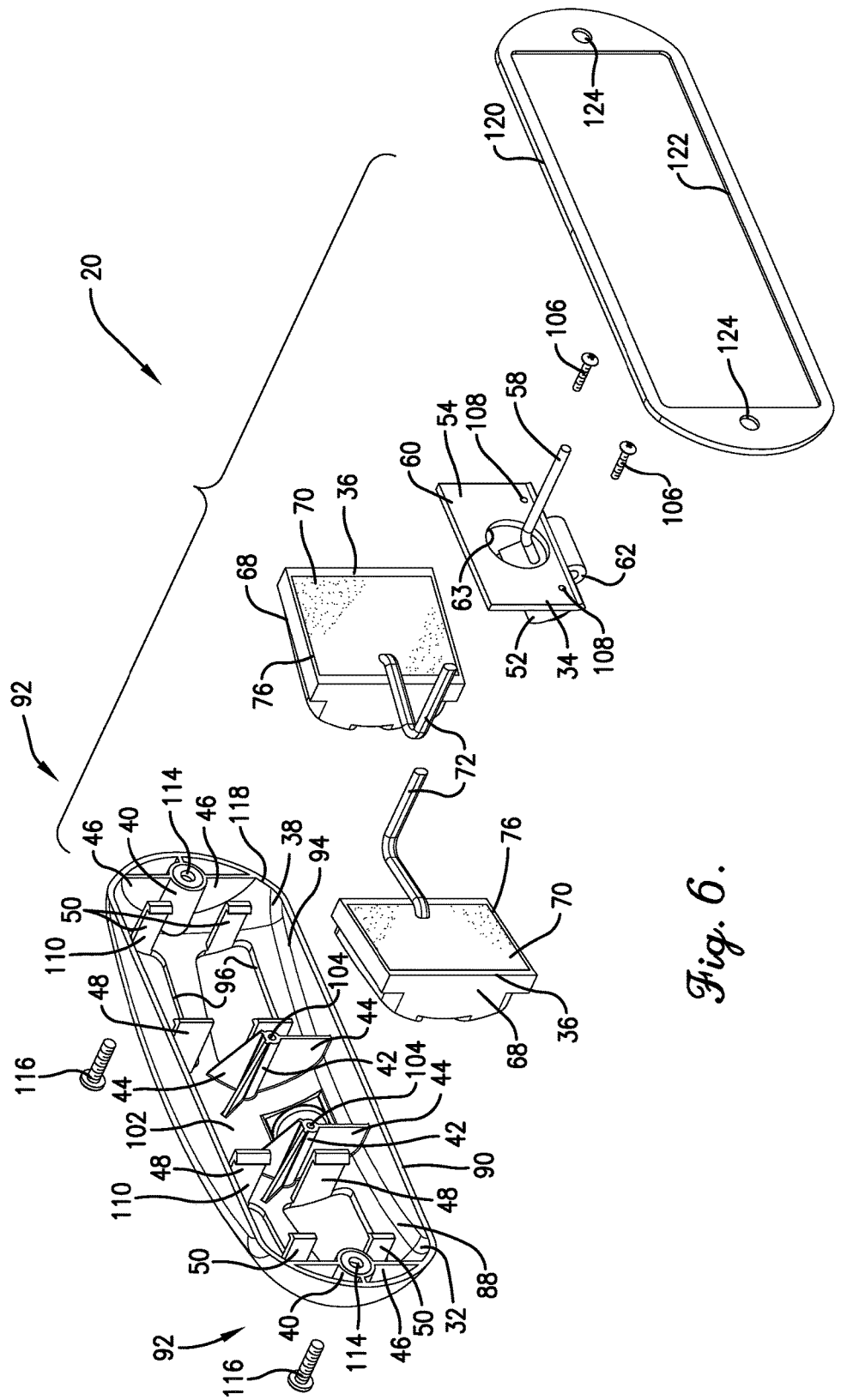
FIG. 6 is an exploded rear perspective of the video assembly shown in FIGS. 1-5.

The camera bosses 42 are positioned on opposite sides of a central portion 102 of the chamber 94 to secure the camera 34 within the housing 32 (see FIGS. 4-6). As will be discussed, the central portion 102 is configured to removably receive the camera 34. The central portion 102 of the chamber 94 preferably communicates with the camera opening 100 so that the camera 34 can view an exterior area adjacent to the housing 32 while being positioned within the housing 32.

The camera bosses 42 project from the interior surface 88 and present threaded fastener openings 104 (see FIG. 6). The camera bosses 42 are each reinforced with gussets 44. The camera bosses 42 and gussets 44 are preferably integrally formed with the shell 38. However, it is within the scope of the present invention where the housing 32 is alternatively configured to receive the camera 34.

The camera 34 is preferably removably mounted within the chamber 94 of the housing 32 using threaded fasteners 106. The camera 34 is positioned by inserting the lens 56 into the central portion 102 of the chamber 94 and then into the camera opening 100. The camera 34 is oriented so that the base plate 60 abuts the camera bosses 42 (see FIG. 5) and holes 108 (see FIG. 6) in the base plate 60 are aligned with fastener openings 104. The fasteners 106 are then threaded into the bosses 42 to secure the camera 34 to the housing 32. Similarly, to remove the camera 34, the fasteners 106 are threaded out of engagement with the housing 32. However, the camera 34 could be alternatively secured to the housing 32.

In the illustrated embodiment, at least part of the exposed surface 86 projects outboard of the camera 34 to protect the camera 34 when the video assembly 20 is mounted to the vehicle 22. For instance, the outboard apex A of the housing 32 preferably is positioned outboard of the camera 34, with the camera 34 being located below the outboard apex A.

However, the housing 32 could be alternatively shaped without departing from the scope of the present invention.

Each pair of connectors 48,50 is positioned on opposite sides of and cooperatively define a socket 110 within the chamber 94 to secure a corresponding one of the lights 36 within the housing 32 (see FIGS. 5 and 6). As will be discussed, the sockets 110 are configured to removably receive corresponding lights 36. Each socket 110 preferably communicates with a pair of light openings 96 so that each light 36 can illuminate the exterior area adjacent to the housing 32 while being positioned within the housing 32.

The connectors 48,50 each comprise an elongated and flexible structure to resiliently engage one of the lights 36. The connectors 50 are configured to present part of the mounting surface 90, with the connectors 48 being spaced outboard of the mounting surface 90. When the housing 32 is secured to the vehicle 22, the ends of connectors 50 preferably engage the exterior surface of the vehicle to restrict movement of the connectors 50. However, the connectors 48,50 could be alternatively laterally positioned.

The connectors 48,50 are configured to be resiliently flexed between an unflexed position, where no force is applied to the connector, and a flexed position, where a lateral force is applied to the connector. The connectors 48,50 each include a catch 112 at an unsupported end thereof (see FIGS. 4 and 5). The connectors 48,50 project from the interior surface 88 and are preferably integrally formed with the shell 38. However, the housing 32 could be alternatively configured to receive the lights 36 without departing from the scope of the present invention.

Each light 36 is preferably located in a secured position by inserting the lens cover 68 into the socket 110 and then partly into the light openings 96. The light 36 is oriented so that the protrusions 74 extend into the corresponding light openings 96 and the stop surface 78 abuts the respective dividing section 98 of the shell 38.

As the light 36 slides toward the secured position, the inboard rim 76 urges each pair of connectors 48,50 to move away from one another, by shifting out of an unflexed position (see FIG. 5) and into a flexed position (not shown), until the catches 112 clear the inboard rim 76. In the secured position, the connectors 48,50 generally return to the unflexed position where the catches 112 engage the inboard rim 76. However, it will be appreciated that at least one of the connectors 48,50 could be flexed to some degree while the catches 112 are in engagement with the inboard rim 76. Thus, when slid into the secured position, the light 36 is snapped into removable engagement with the connectors 48,50. To remove the light 36, the pairs of connectors 48,50 are manually shifted away from each other and into the flexed position (not shown) so that the catches 112 are disengaged from the rim 76. However, it will be appreciated that the housing 32 and/or lights 36 could be alternatively configured for securement to one another.

Each of the illustrated lights 36 is preferably mounted between the apex A and a corresponding one of the housing ends 92. Furthermore, at least part of the exposed surface 86 projects outboard of the lights so that the housing 32 protects the lights when the video assembly 20 is mounted to the vehicle 22.

The mounting bosses 40 are preferably located adjacent to each end 92 of the housing 32 and are configured to mount the housing to the vehicle 22. Preferably, the mounting bosses 40 project from the interior surface 88 to present part of the mounting surface 90. The housing 32 also preferably presents fastener openings 114 that intersect the exposed surface 86 and extend through the shell 38 and the mounting bosses 40 (see FIGS. 6 and 7). Thus, the fastener openings 114 are preferably located adjacent to corresponding housing ends 92. The mounting bosses 40 are each reinforced with gussets 46. The mounting bosses 40 and gussets 46 are preferably integrally formed with the shell 38.

The fastener openings 114 are configured to receive threaded fasteners 116 to secure the housing 32 to the vehicle 22 (see FIGS. 6 and 7). The fasteners 116 enable the video assembly 20 to be attached to the vehicle 22 and removed therefrom as a self-contained module. Preferably, the housing 32 has an area R between the fastener openings 114 that is devoid of threaded fasteners to attach the housing 32 to the vehicle 22. However, it is within the scope of the present invention where the housing 32 is alternatively configured for being mounted on the vehicle 22.

The illustrated housing 32 includes a synthetic resin material and is preferably molded into a unitary form. However, the housing 32 could include one or more alternative materials, such as a metal material (e.g., aluminum, carbon steel, or stainless steel).

Each housing 32 is preferably removably mounted to the service compartment 28. The shell 38 preferably includes an endless rim 118 that presents part of the mounting surface 90 and forms a peripheral margin of the housing 32. The video assembly 20 also preferably includes an endless gasket 120 to engage the rim 118 (see FIGS. 6 and 7). The gasket 120 presents a gasket opening 122 and fastener holes 124. The gasket 120 preferably includes an elastomeric material, such as a nitrile material, but could include an alternative material suitable for providing a seal.

Figure 2:
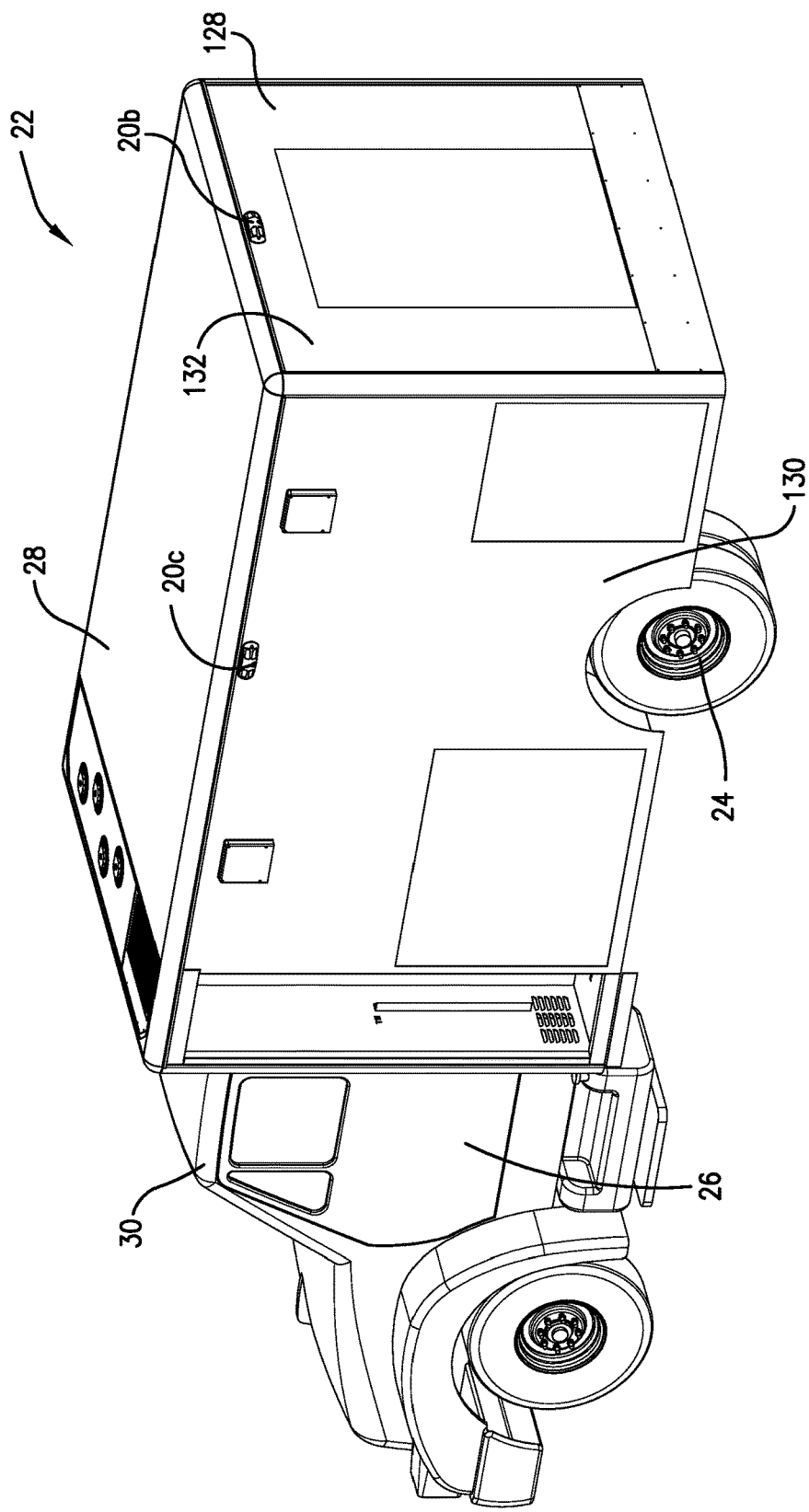
FIG. 2 is a rear perspective of the emergency response vehicle shown in FIG. 1.

The service compartment 28 includes a front wall 126, a back wall 128, and side walls 130 that present an exterior compartment surface 132 (see FIGS. 1 and 2). Each wall 126,128,130 includes a predetermined location where one of the housings 32 is to be mounted. The predetermined locations each present an access opening (not shown) to receive the sensor and power wires 58,72.

The gasket 120 is positioned at one of the predetermined locations in direct contact with the compartment surface 132 along an endless line of engagement (not shown). The housing 32 is then located so that the rim 118 abuts the gasket 120 along another endless line of engagement (not shown). The housing 32 and gasket 120 are removably secured to the corresponding wall 126,128,130 with fasteners 116.

When the housing 32 is secured to the vehicle 22, generally the entire mounting surface 90 of the housing 32 is brought into contact with the gasket 120 to engage the compartment surface 132. For instance, the ends of connectors 50 are preferably brought into contact with the gasket 120 to engage the compartment surface 132 so as to restrict movement of the connectors 50. The threaded fasteners 116 are inserted through fastener openings 114 and threaded into engages with the wall 126,128,130 of the compartment 28.

Again, the video assemblies 20 preferably include the front video assembly 20a, a rear video assembly 20b, and opposite side video assemblies 20c. The video assemblies 20b,c are preferably mounted by first installing the camera 34 and lights 36 within the housing 32. With the camera 34 and lights 36 installed, the sensor and power wires 58,72 are inserted through the access opening associated with the corresponding predetermined location. The sensor and power wires 58,72 are then electrically connected to a power supply (not shown) and a computer (not shown) used to collect video data from the camera 34. The video assembly 20b,c is then configured to be secured to the compartment 28 as a self-contained module using the fasteners 116. Similarly, components of the video assemblies 20b,c can be selectively accessed and removed from the compartment 28 by removing the fasteners 116.

The front video assembly 20a is mounted by installing the lights 36 within the housing 32. However, the camera 34 associated with the front video assembly 20a is preferably mounted exteriorly of the housing 32 at a location adjacent to the front grille of the truck 30. The power wires 72 are inserted through the access opening associated with the predetermined location for the front video assembly 20a. The sensor and power wires 58,72 are then electrically connected to the power supply and the computer. The housing 32 and lights 36 are then configured to be secured to the compartment 28 as a self-contained module using the fasteners 116. Similarly, components of the video assembly 20a can be selectively accessed and removed from the compartment 28 by removing the fasteners 116.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A modular video assembly configured to be mounted on an exterior surface of a vehicle, said modular video assembly comprising:
    an elongated housing presenting spaced apart housing ends and a chamber between the housing ends; and
    a camera removably mounted at least partly within the chamber,
    said housing presenting an inboard mounting surface that extends longitudinally between the housing ends, with the mounting surface operable to be opposed to the exterior surface when the assembly is mounted to the vehicle, wherein the mounting surface is configured as an endless rim that forms a peripheral margin of the housing, wherein the endless rim surrounds a back opening that extends between the housing ends and provides access to the chamber,
    said housing presenting an outboard exposed surface that extends longitudinally to at least partly cover the chamber and located outboard of the mounting surface,
    at least part of the exposed surface projecting outboard of the camera to protect the camera when the assembly is mounted to the vehicle.

2. The modular video assembly as claimed in claim 1,
    said mounting surface and said exposed surface cooperatively defining a lateral width dimension of the housing,
    said exposed surface defining an outboard apex of the housing where the lateral width dimension is at a maximum,
    said outboard apex being located between the housing ends, with the lateral width dimension tapering from adjacent the outboard apex toward at least one of the housing ends.

3. The modular video assembly as claimed in claim 2,
    said camera including a lens located below the outboard apex.

4. The modular video assembly as claimed in claim 2,
    said exposed surface including a generally convex section that forms the outboard apex.

5. The modular video assembly as claimed in claim 4; and
    lights mounted in the chamber adjacent to the camera, with at least one of the lights mounted between the apex and one of the housing ends and at least another one of the lights mounted between the apex and the other one of the housing ends.

6. The modular video assembly as claimed in claim 5,
    said at least part of the exposed surface projecting outboard of the lights so that the housing protects the lights when the assembly is mounted to the vehicle.

7. The modular video assembly as claimed in claim 2,
    said housing presenting fastener openings that intersect the exposed surface; and
    mounting fasteners removably inserted into respective fastener openings of the housing, with the mounting fasteners operable to removably secure the assembly to the vehicle.

8. The modular video assembly as claimed in claim 1; and
    lights mounted in the chamber adjacent to the camera, with at least one of the lights mounted between the apex and one of the housing ends and at least another one of the lights mounted between the apex and the other one of the housing ends.

9. The modular video assembly as claimed in claim 8,
    said housing presenting fastener openings that intersect the exposed surface; and
    mounting fasteners removably inserted into respective fastener openings of the housing, with the mounting fasteners operable to removably secure the assembly to the vehicle.

10. The modular video assembly as claimed in claim 9,
    said fastener openings cooperatively defining an area therebetween that is devoid of mounting fasteners to removably secure the assembly to the vehicle.

11. The modular video assembly as claimed in claim 9,
    said exposed surface presenting light openings located between the fastener openings and communicating with the chamber, with the light openings permitting light to be transmitted from the lights to an exterior area.

12. The modular video assembly as claimed in claim 8,
    said housing including a set of opposed flexible connectors that cooperatively define a socket to receive a corresponding light,
    said connectors having an unflexed position where the connectors cooperatively secure the light within the socket and a flexed position where the connectors are moved away from one another to permit insertion and removal of the light relative to the socket.

13. The modular video assembly as claimed in claim 1,
    said housing ends each including a mounting boss that presents part of the mounting surface, said housing ends presenting respective fastener openings that each extend through a corresponding one of the mounting bosses and intersect the exposed surface.

14. The modular video assembly as claimed in claim 13, said housing ends each including a gusset that interconnects a corresponding boss and the endless rim.

15. The modular video assembly as claimed in claim 1; and
a light mounted in the chamber adjacent to the camera,
said housing including a set of opposed flexible connectors that cooperatively define a socket to receive the light,
said connectors having an unflexed position where the connectors cooperatively secure the light within the socket and a flexed position where the connectors are moved away from one another to permit insertion and removal of the light relative to the socket.

16. A modular video assembly configured to be mounted on an exterior surface of a vehicle, said modular video assembly comprising:
an elongated housing presenting spaced apart housing ends and a chamber between the housing ends;
a camera removably mounted at least partly within the chamber,
said housing presenting an inboard mounting surface that extends longitudinally between the housing ends, with the mounting surface operable to be opposed to the exterior surface when the assembly is mounted to the vehicle,
said housing presenting an outboard exposed surface that extends longitudinally to at least partly cover the chamber and located outboard of the mounting surface,
at least part of the exposed surface projecting outboard of the camera to protect the camera when the assembly is mounted to the vehicle,
said housing including an endless rim that forms a peripheral margin of the housing,
said endless rim presenting at least part of the mounting surface, and
a light mounted in the chamber adjacent to the camera,
said housing including a set of opposed flexible connectors that cooperatively define a socket to receive the light,
said connectors having an unflexed position where the connectors cooperatively secure the light within the socket and a flexed position where the connectors are moved away from one another to permit insertion and removal of the light relative to the socket,
at least one of said connectors presenting part of the mounting surface,
said at least one connector engaging the exterior surface when the assembly is mounted to the vehicle to restrict movement of the at least one connector between the flexed and unflexed positions.

* * * * *